United States Patent [19]

Yonezawa et al.

[11] 4,411,500

[45] Oct. 25, 1983

[54] OPTICAL SYSTEM FOR REPRODUCING INFORMATION

[75] Inventors: Seiji Yonezawa, Hachiouji; Toshio Sugiyama, Toyokawa, both of Japan

[73] Assignee: Hitachi, Ltd., Tokyo, Japan

[21] Appl. No.: 157,254

[22] Filed: Jun. 6, 1980

[30] Foreign Application Priority Data

Jun. 25, 1979 [JP] Japan ............... 54-85976[U]

[51] Int. Cl.³ .............................................. G02B 17/00
[52] U.S. Cl. ...................... 350/446; 369/118; 369/122; 372/43
[58] Field of Search ............... 350/409, 446, 447, 173; 372/43; 369/122, 118

[56] References Cited

U.S. PATENT DOCUMENTS

| | | | |
|---|---|---|---|
| 1,712,112 | 5/1929 | Kauffel | 350/445 |
| 3,396,344 | 8/1968 | Broom | 369/122 X |
| 3,773,404 | 11/1973 | Moore | 350/449 X |
| 3,784,286 | 1/1974 | Dudrange | 350/449 X |
| 3,974,507 | 8/1976 | Chemelli et al. | 372/101 X |
| 4,171,870 | 10/1979 | Bruning et al. | 350/446 X |
| 4,283,147 | 8/1981 | Dreyfus et al. | 350/449 X |
| 4,333,173 | 6/1982 | Yonezawa et al. | 369/122 X |

FOREIGN PATENT DOCUMENTS 362482 10/1922 Fed. Rep. of Germany ...... 350/173

OTHER PUBLICATIONS

Takeda et al., "Use of Heterostructure Diode Lasers in Video Disk Systems," *Applied Optics*; vol. 17, No. 6; Mar. 15, 1978.

*Primary Examiner*—John K. Corbin
*Assistant Examiner*—Scott J. Sugarman
*Attorney, Agent, or Firm*—Antonelli, Terry & Wands

[57] ABSTRACT

An optical system characterized in that a plano-convex lens for guiding onto a disk a light beam emitted from a semiconductor laser, and a prism for deriving reflected light from the disk are unitarily formed.

11 Claims, 7 Drawing Figures

OPTICAL SYSTEM FOR REPRODUCING INFORMATION

BACKGROUND OF THE INVENTION

1. Field of the Invention

This invention relates to optical systems, and more particularly to an optical system suitable for optically reproducing information stored in a recording medium.

2. Description of the Prior Art

As an apparatus for optically reproducing information, there has heretofore been the so-called optical disk.

The optical disk is such that a semiconductor laser, for example, is employed as a light source, a light beam emergent from the laser being projected on an information medium (disk) by an optical system, whereby information recorded on the disk is reproduced or information is recorded on the disk. FIG. 1 is a diagram showing the schematic construction of a prior-art optical disk apparatus, and principally illustrates an optical system. Referring to FIG. 1, a light beam emitted from a semiconductor laser 1 is guided to a first lens 5 through a prism 20. Here, as shown in the figure the prism 20 is composed of three prisms 2, 3 and 4, which are constructed into a unitary optical component so that the light beam having entered the prism assembly from the side of the semiconductor laser 1 may pass through the prisms 2 and 3 and proceed towards the lens 5 and that a light beam having entered the prism assembly conversely from the side of the lens 5 may be reflected at the joint plane A between the prisms 2 and 3 and proceed towards the prism 4. The light beam guided to the first lens 5 is substantially collimated by this lens, and is projected as a minute light spot on a disk 8 through a second lens 6 which is supported by a voice coil 7. This light beam is reflected by the disk 8, and the reflected beam is received by a photodetector 9 after having passed through the second lens 6, the first lens 5 and the prisms 3 and 4. At this time, if information is recorded on the disk 8 (by way of example, information is recorded by pits which are formed in the disk surface in accordance with the information), the reflected beam has its intensity modulated according to the information, so that the information is obtained in the form of output signals of the photodetector 9. The voice coil 7 serves to move the second lens 6 small distances at a high speed, and is comprised for the purpose of a light spot control, i.e., auto-focusing control or tracking control.

In such apparatus, the laser beam emitted from the semiconductor laser employed as the light source has a divergence or exhibits a ratio of eccentricity being about 3 to 1 and therefore shows an anisotropic (elliptic) far-field pattern. Accordingly, when it is focused on the disk as it is, the beam spot does not become an isotropic (circular) distribution pattern on the disk, and the frequency characteristics of the optical reading of the disk worsen.

In the prior art, therefore, in order to bring a beam spot from a semiconductor laser into a circular distribution in case of employing the semiconductor laser as a light source, the size of the aperture of a lens is appropriately set when a laser beam is transmitted through the lens. That is, by utilizing the numerical aperture (the so-called NA) of the lens, the elliptic distribution pattern is converted into the circular distribution pattern.

With such prior art, however, there is the disadvantage that a lens having a predetermined NA must be used. Further, in case of a low NA, combined lenses (the number of lenses is 2 to 3) must be used, which results in the disadvantage of a complicated construction.

Moreover, in the apparatus of the construction as shown in FIG. 1, outputs from the photodetector must be made sufficiently great in order to detect the information signals at a good signal-to-noise ratio. To this end, the facets of the prism and the lens, for example, one facet 3a of the prism 3 and one facet 5a of the first lens 5 need to be provided with thin films, thereby to prevent the reflection of the light beam and to lessen to the utmost the loss of the light beam due to the prism as well as the lens. In the prior-art optical disk apparatus as shown in FIG. 1, however, the respective constituent elements of the optical system, i.e., the prism and the lenses are all separate, so that the optical efficiency is low and the number of times of the evaporations of the anti-reflection films on the prism, the lens etc. becomes large, resulting in the disadvantage of high cost. Further disadvantages are that since the prism and the lenses are separate, the adjustment of the optical axes of the prism and the lenses is difficult, and that the whole apparatus becomes large on account of the large number of components involved.

SUMMARY OF THE INVENTION

This invention has for its object to provide a simple optical system which brings a beam spot to be projected on a disk surface into a circular distribution pattern and also reduces the influences of parent aberrations ascribable to a lens on the spot.

Another object of this invention is to provide an optical system which has a high optical efficiency, which includes a small number of components and which can be simply adjusted.

In order to accomplish such objects, this invention consists in that a plano-convex lens is employed as a lens through which a beam from a semiconductor laser is projected.

DESCRIPTION OF THE PREFERRED EMBODIMENTS

Figure 1:
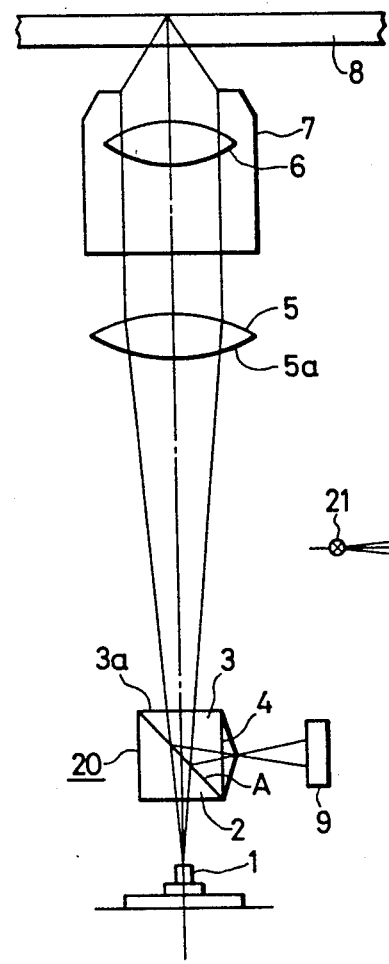
FIG. 1 is a diagram showing the schematic construction of a prior-art optical disk apparatus.
Figure 2:
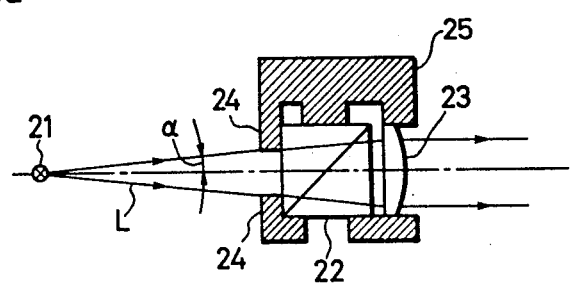
FIG. 2 is a diagram showing the construction of an embodiment of this invention.

FIG. 2 is a diagram showing the construction of an embodiment of this invention. Referring to the figure, a light beam L from a semiconductor laser 21 is emitted towards a polarizing beam splitter 22 and enters a plano-convex lens 23. At this time, in a part of a holder 25 which supports the polarizing beam splitter 22, a circular opening formed by opposed parts 24 is provided in a manner to face an optical path. The angle of view $\alpha$ of the opening toward the semiconductor laser 21 is set so as to satisfy the relationship $\alpha < \theta_\| < \theta_\perp$. Here, $\theta_\perp$ and $\theta_\parallel$ denote half divergence angles of the beam of the semiconductor laser in a direction perpendicular to the junction of the semiconductor laser and in a direction parallel thereto, respectively. This construction renders the NA of the lens 23, in effect, sin α and obviates the intricacy of employing a lens of a predetermined NA as the lens 23. Further, as the lens, the single plano-convex lens 23 is used without employing the combined lenses in the prior art and its plane is arranged so as to face the side of the semiconductor laser 21, whereby aberrations are satisfactorily removed.

The reasons are as follows. First, since the semiconductor laser employed as the light source has a single oscillation wavelength (for example, 8,300 Å), a correction lens for correcting for chromatic aberration is unnecessary. Secondly, since the NA is small in consideration of the half divergence angle (for example, $\theta_\parallel \simeq 8°$) of the semiconductor laser 21, a correction lens for correcting an off-axial beam is dispensed with. Thirdly, the wave front of the beam of the semiconductor laser is a fairly good spherical wave and need not be corrected. From these points, even the single lens can be satisfactorily used. Now, even in case of fabricating a single lens, if it includes a curvature, a jig which conforms with the curvature must be prepared. In addition, the step of polishing a lens material into a plane is inevitably involved as a preceding step for precisely forming the curvature. Therefore, the plano-convex lens is advantageously from the standpoint of the manufacturing process as the single lens having the property of convergence.

Figure 3A:
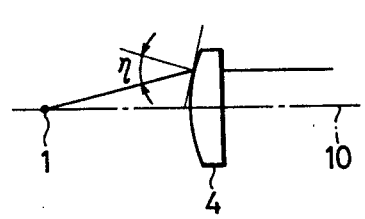
FIGS. 3(a) and 3(b) are diagrams for explaining the operation of the embodiment shown in FIG. 2.
Figure 3B:
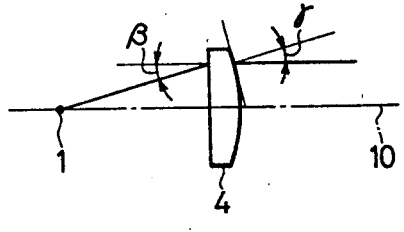

There will now be explained a method of setting the plano-convex lens in FIG. 2. Let's consider cases where the directions of curvatures are different as shown in FIGS. 3(a) and 3(b) with respect to the beam from the semiconductor laser 21. In the case of FIG. 3(a), the incident beam enters the lens at η in terms of an angle which is defined relative to the normal to the entrance facet. In the case of FIG. 3(b), the angle becomes β, and the emergent beam emerges at γ in terms of an angle relative to the normal to the exit facet. It is accordingly obvious that $\eta > \beta, \gamma$ holds.

In order to lessen the aberrations of the lens, the angle of the incident beam relative to the normal to the entrance facet needs to be made as narrow as possible. This is greatly influential on especially the spherical aberration. It is accordingly understood that the setting illustrated in FIG. 3(b) is better. In other words, the plano-convex lens should have the structure in which the plane part thereof is arranged in the manner to face the light source.

As described above, the lens which the beam from the semiconductor laser enters is constructed of the single plano-convex lens, the plane part of the lens is caused to face the light source and the effective opening is provided midway in the optical path, whereby the optical head can be realized with the simple construction.

Figure 4:
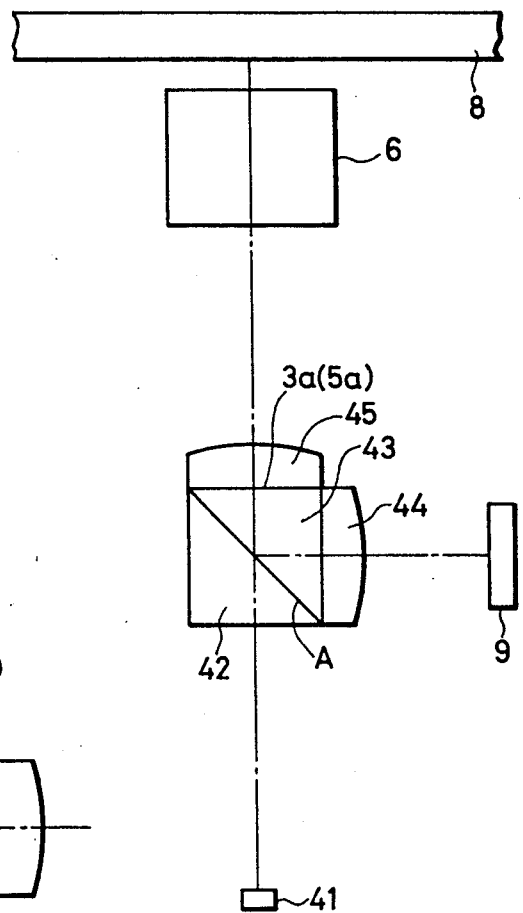
FIG. 4 is a diagram showing the construction of another embodiment of this invention.

FIG. 4 is a diagram showing the construction of another embodiment of this invention in which the optical system is further simplified. Referring to the figure, a light beam emitted from a semiconductor laser 41 passes through prisms 42 and 43 and a first lens 45 to be substantially collimated, and the collimated light beam is projected as a minute light spot on a disk 8 by a second lens 46 which is supported by a voice coil (not shown). A reflected beam from the optical disk 8 passes through the second lens 46, the first lens 45 and the prism 43, is reflected by the joint plane A between the prisms 42 and 43, passes through a lens 44 and is received by a photodetector 9. In the present embodiment, one facet 5a of the first lens 45 is designed to be planar and is stuck with one facet 3a of the prism 43 so as to put the first lens and the prism into a unitary structure. By sticking the first lens 45 and the prism 43 together as in the present embodiment, it becomes unnecessary to evaporate antireflection films on the facet 5a of the lens 45 and the facet 3a of the prism 43, and also the loss of the light lessens. Further, the optical system is readily adjusted, it becomes immune against vibrations and it can be miniaturized.

Figure 5A:
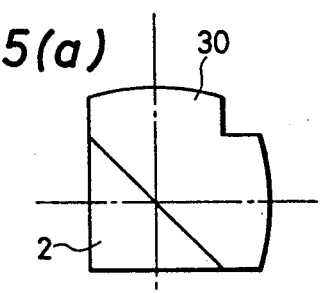
FIGS. 5(a) and 5(b) are diagrams each showing the essential portions of another embodiment of this invention.
Figure 5B:
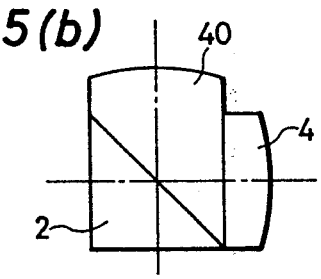

FIGS. 5(a) and 5(b) are diagrams each showing the essential portions of another embodiment of this invention. A component 30 shown in FIG. 5(a) is obtained in such a way that the first lens 45, the prism 43 and the lens 44 depicted in FIG. 4 are unitarily formed in the stage of manufacture, while a component 40 shown in FIG. 5(b) is obtained in such a way that the first lens 45 and the prism 43 are unitarily formed in the stage of manufacture. Such unitary formation can be realized with a technique having heretofore been known well, for example, by the resin molding of plastics. By unitarily forming the first lens 45 and the prism 43 at the stage of manufacture as in the present embodiment, the numbers of components of the optical systems can be sharply reduced.

As thus far described, according to this invention, an optical system which has a high optical efficiency, which includes a small number of components and which is simply adjusted is realizable.

What is claimed is:

1. An optical system for reproducing information recorded on a disk comprising:
   light source means including a semiconductor laser for emitting a laser beam having a substantially-elliptical distribution pattern; and
   means for converting the substantially-elliptical distribution pattern of the laser emitted by the light source means into a substantially-circular distribution pattern on said disk, wherein said means for converting comprises:
   a plano-convex lens which is disposed along the optical path of said laser beam between said light source means and said disk, the plane part of the plano-convex lens being arranged on the side of said light source means; and
   means providing a circular opening which is smaller than the divergence of the laser beam of the light source means and is provided in the optical path between said light source means and said plano-convex lens.

2. An optical system for reproducing information according to claim 1, wherein a beam splitter comprising two prisms joined together is disposed between the light source and the plano-convex lens for deriving a reflected beam from the disk.

3. An optical system for reproducing information according to claim 2, wherein a holder supports said beam splitter, and said circular opening is provided in a part of said holder.

4. An optical system for reproducing information according to claim 2, wherein said plane part of said plano-convex lens is joined to one surface of one prism of said beam splitter.

5. An optical system for reproducing information according to claim 4, wherein a further lens is in contact with the other surface of said one prism for guiding said reflected beam onto a photodetector.

6. An optical system for reproducing information according to claim 2, wherein said plano-convex lens and one prism of said beam splitter are formed as a unitary member.

7. An optical system for reproducing information according to claim 6, wherein said unitary member is made by the resin molding of plastics.

8. An optical system for reproducing information according to claim 6, wherein a further lens for guiding said reflected beam onto a photodetector is in contact with said one prism.

9. An optical system for reproducing information according to claim 2, wherein said plano-convex lens, one prism of said beam splitter and a further lens for guiding said reflected beam onto a photodetector are formed as a unitary member.

10. An optical system for reproducing information according to claim 9, wherein said unitary member is made by the resin molding of plastics.

11. An optical system for reproducing information recorded on a disk comprising:
light source means including a semiconductor laser for emitting a laser beam having a substantially-elliptical distribution pattern;
a plano-convex lens which is disposed along the optical path of said laser beam between said light source means and a disk, the plane part of the plano-convex lens being arranged on the side of said light source means; and
means providing a circular opening which is smaller than the divergence of the laser beam of the light source means and is provided in the optical path between said light source means and said plano-convex lens;
wherein said light source means, plano-convex means and circular opening are constructed and arranged so as to cooperate with each other for converting the substantially-elliptical distribution pattern of the laser emitted by the light source means into a substantially-circular distribution pattern on said disk.

* * * * *